United States Patent Office 2,890,946
Patented June 16, 1959

2,890,946

SOOT INHIBITING COMPOSITION

Donald R. Anderson, Downers Grove, and William R. Watson, Chicago, Ill., assignors to National Aluminate Corporation, Chicago, Ill., a corporation of Delaware No Drawing. Application February 14, 1955
Serial No. 488,154

9 Claims. (Cl. 44—68)

This invention relates to a soot inhibiting composition, particularly a composition in liquid form especially adapted for use in oil burning furnaces and other oil burning equipment such as oil burning locomotives, fire-up torches, and the like.

It has been recognized heretofore that certain materials, when added to fuel, will reduce the amount of soot and other fireside deposits caused by the use of the fuel, and will enhance the removal of already existing deposits. Copper salts have been found to be particularly effective in this respect and have been proposed for use in soot remover compositions. An excellent soot remover composition is described, for examle, in U.S. Patent 2,622,671. In this last mentioned composition the active essential ingredient is a copper salt of a branched chain acyclic aliphatic carboxylic acid having 5 to 12 carbon atoms, in which the carboxyl group is attached to a carbon atom other than the central carbon atom in the longest hydrocarbon chain.

One of the objects of the present invention is to provide a new and improved soot inhibiting composition. Another object of the invention is to prepare a new and useful stable liquid concentrate which can be added to fuels, especially hydrocarbon distillate oils, in small amounts to inhibit the formation of soot and other fireside deposits. Other objects will appear hereinafter.

In accomplishing these objects in accordance with the invention it has been found that a liquid oil soluble concentrate which gives improved results in inhibiting soot formation and fireside deposits, when added in small amounts to a fuel oil, can be prepared by dissolving an oil soluble copper salt and a halogen-substituted phenol in a hydrocarbon distillate oil, together with an ether of a polyol which is both water soluble and oil soluble in the concentrations in which it is used. The composition can also advantageously contain an oil soluble surface active dispersing agent.

Typical examples of concentrates prepared in accordance with the invention are the following in which the quantities are given in percent by weight:

| Composition | A | B | C |
|---|---|---|---|
| | Percent | Percent | Percent |
| Copper octoate (8% Cu) | 15 | 15 | 10 |
| Pentachlorophenol | 10 | 10 | 6 |
| Butyl Carbitol | 5 | 5 | 3 |
| Antioxidant | | 3.6 | 2.5 |
| Surface active agent | | 1 | 1 |
| No. 2 diesel fuel oil | 70 | 65.4 | 77.5 |

In the foregoing compositions, the antioxidant may be, for example, a blend of phosphorous organic sulfur compounds and barium organic sulfur compounds having a specific gravity of 0.97 and containing 3.8 to 4.0% barium, 1.0 to 2% phosphorous, and 3.6 to 4.5% sulfur. Suitable antioxidizing agents which are available commercially are, for example, Santolube 205 and Santolube 205A. It will be understood that the employment of the antioxidant is optional.

The surface active agent can be, for example, an alkyl aryl petroleum sodium sulfonate of which an illustration is the product sold under the commercial name Brunate. The employment of the surface active agent is also optional for the practice of the present invention.

The butyl Carbitol in the foregoing compositions is the butyl ether of diethylene glycol and has the chemical formula $$C_4H_9OCH_2CH_2OCH_2CH_2OH$$

Other examples of substances which may be substituted for the butyl Carbitol in the foregoing compositions are the ethyl ether of ethylene glycol, the ethyl ether of diethylene glycol, the methyl ether of ethylene glycol, the methyl ether of diethylene glycol, the propyl ether of ethylene glycol, the propyl ether of diethylene glycol, the butyl ether of ethylene glycol, the methyl ether of dipropylene glycol, the ethyl ether of dipropylene glycol, the dimethyl ether of propylene glycol, the diethyl ether of propylene glycol and the mono- and/or diethers of higher polyoxyalkylene glycols which are water soluble and contain both oxypropylene groups and oxyethylene groups in the same molecule. In these last mentioned polyoxyalkylene glycol ethers the oxypropylene groups can form the central part of the molecule and have attached thereto oxyethylene groups to which the terminal ether group is attached. Such ethers can also be described as water soluble ethers of oxyethylated polyoxypropylene glycols. For the purpose of the present invention, the terminal ether group or groups should not contain more than about 6 carbon atoms. The terminal ether group can be a phenoxy group or a chlorophenoxy group (e.g., phenyl Carbitol or 2,4-dichlorophenyl Carbitol). The polyol can be glycerine or other polyhydric alcohol.

The copper octoate employed in compositions A, B and C is a copper salt of 2-ethylhexanoic acid containing about 8% copper. Other copper salts which can be employed but are less desirable for the purpose of the invention are copper naphthenate, copper tallate and copper linoleate.

Instead of pentachlorophenol, other halo phenols can be employed for the purpose of the invention but are less desirable. Examples of such other halo phenols are orthochlorophenol, orthobromophenol, para-chlorophenol, 2,4,6-trichlorophenol, 2,4,6-tribromophenol, 2,4,5-trichlorophenol, 2,4,5-tribromophenol, 2,3,4,6-tetrachlorophenol, 2,3,4,6-tetrabromophenol and pentabromophenol.

One of the difficulties encountered in the preparation of compositions for the purpose of the invention is the tendency of the copper to react with the phenolic —OH group to form a copper phenate. Thus, when pentachlorophenol and copper octoate were added to a distillate oil, a red precipitate formed immediately. The addition of an ether of a polyol of the type previously described prior to bringing together the copper octoate and the pentachlorophenol, prevented the formation of the red precipitate.

In compositions A, B and C, the No. 2 diesel fuel oil is a distillate oil having a minimum flash point of 100° F., a maximum pour point of 20° F., a 90% distillation point of about 675° F., a maximum viscosity of about 40 S.U.S. (Saybolt Universal seconds) at 100° F., and a gravity of about 26° API. In the specific compositions given, one type of No. 2 diesel fuel oil which was employed was a virgin gas oil. This was a straight run, uncracked distillate having a specific gravity of 0.84 and a flash point (Pensky-Martin) of 170° F. to 175° F. A very satisfactory hydrocarbon distillate for the purpose of the invention is Shell's medium aromatic oil with a boiling range of 430 to 620° F. and a flash point of 225° F. (Cleveland open cup). In general, it is advantageous for the hydrocarbon distillate which serves as a carrier for the active ingredients in the concentrate to have a high aromatic concentration, preferably at least 40% aromatic content, including olefins. The hydrocarbon distillates in the following table are especially suitable for the preparation of concentrates for the purpose of the invention.

Table

| | Hydrocarbon Liquid No. | | | | | |
|---|---|---|---|---|---|---|
| | 1 | 2 | 3 | 4 | 5 | 6 |
| Gravity, API | 22.2 | | | 8.5 | 16.0 | |
| Flash Point, °F | 210 | 250 | 210 | 239 | 245 | 205 |
| Viscosity, SUS at 100°F | 34 | 42 | | 50 | 35 | 37.3 |
| Initial Boiling Point, °F | 422 | 488 | 430 | 346 | 476 | 415 |
| Aromatic Content, including olefins, percent | 44.8 | 70 | 83 | 50 | 100 | 63 |
| Specific Gravity | 0.9206 | 0.947 | 0.931 | | 0.959 | 0.954 |

The proportions of the components of the concentrate are subject to variation but the hydrocarbon distillate is preferably employed in an amount corresponding to at least 30% by weight of the concentrate. The quantity of the copper salt is preferably such that the amount of copper, calculated as Cu, is within the range of 0.4% to about 1.5% by weight of the concentrate. The quantity of the halo phenol is preferably within the range of 2% to 15% by weight of the concentrate. Expressing these percentages as a weight ratio of halo phenol to Cu, the halo phenol content of the concentrate will be within the range of 1.33–37.5 parts by weight per part of Cu. The quantity of the ether of the polyol is preferably within the range of about 3% to about 15% by weight of the concentrate. The weight ratio of the ether of the polyol to the halo phenol is preferably within the range of 5:1 to 1:5. Excellent results have been obtained with a weight ratio of about 1:2. Ordinarily, up to 5% by weight of the total concentrate will consist of a surface active agent and an anti-oxidant but we have prepared concentrates containing up to 45% of surface active agents such as sodium petroleum sulfonate.

In preparing concentrates in accordance with the invention, it is desirable that the components of the concentrate be substantially free from water. It is also preferable to first heat the hydrocarbon distillate to about 150° F. and then add thereto the halo phenol with mixing until the two ingredients become homogeneous. Next the ether of a polyol is blended followed by the copper salt. If a surface active agent (surface tension lowering agent) and/or an antioxidant is added, such should be done as the last step prior to the cooling of the concentrate.

The compositions of the invention function as combustion catalysts to lower the ignition temperature of the soot and one method which was used in evaluating them was to measure the ignition temperature of the soot. This was accomplished by the use of an apparatus consisting of a replaceable aluminum foil cylinder with a thermocouple junction on its outer surface. This outer surface was sooted, sprayed with the composition to be tested and heated inside an electric heating coil until the soot burned off. The temperature at the burn-off point was noted on a temperature recorder chart.

The specific procedure employed was as follows: a fresh piece of aluminum foil was snugly wrapped on the foil holder and a small hole was made in the foil to expose the thermocouple bead. The foil was evenly sooted by holding it in the flame of No. 2 fuel oil burning in a small wick burner.

The composition to be tested in the form of an oil solution was applied to the sooted surface by spraying by an atomizer until the surface was just wetted.

The holder was carefully lowered into the heater so that the thermocouple bead and the surrounding area were clearly visible. The thermocouple was connected to the recorder and the heater adjusted to low heat. A safety shield was used to protect the observer in case the oil fumes should ignite while they were being driven off.

The temperature of the foil, as indicated by the thermocouple, was raised about 50° F. per minute. The soot ignition temperature was taken as the indicated temperature when the soot disappeared from an area ½" in diameter surrounding the thermocouple bead.

The accuracy of the device in measuring the ignition temperature of the soot was estimated at ±5° F.

In a series of tests using the above described procedure composition A reduced the soot ignition temperature to 700–705° F. as compared to an average soot ignition temperature for the blank containing no treatment of about 1085° F.

A comparative test was made with a composition containing no pentachlorophenol and consisting of the following components:

15 parts copper salt of 2-ethylhexanoic acid (8% Cu)
5 parts Santolube 205
1 part Indoil Sulfonate AA (a petroleum sulfonate)
79 parts virgin gas oil This last mentioned composition reduced the soot ignition temperature to about 840° F., thereby demonstrating the superiority of the composition of the present invention containing the halo phenol.

Another series of soot tests was carried out during the normal operation of a Clarkson steam generator. Each test was run for 20 hours. Forty square inches of the outer coil of the Clarkson steam generator was marked and used as a standard testing area. This area was cleaned before each test. At the end of each test the soot was removed and weighed. This weight of soot was compared with the weight of soot from a 20-hour test without treatment. The fuel used in these tests was a No. 2 fuel oil. One test was run without any additive. Another test was run with the addition of 1 gallon of composition A per thousand gallons of fuel oil. A third test was run with the addition of one gallon per thousand gallons of fuel oil of a composition of the type previously described containing the same amount of copper octoate as composition A but not containing the pentachlorophenol. The weight of the carbon deposit with composition A after 20 hours was 0.28 gram. The weight of the carbon deposit after 20 hours with the composition containing the copper octoate but not containing the pentachlorophenol was 0.72 gram. The weight of the carbon deposit after 20 hours where the fuel oil was used without any additive was 1.40 grams. This series of tests carried out under actual operating conditions again clearly demonstrates the superiority of the compositions of the present invention over compositions containing no halo phenol.

In another series of tests two Elesco steam generators were used which burn natural gas during the summer months and No. 5 fuel oil the remaining months. In the normal operation of these steam generators the fuel oil had been treated with an additive to reduce the quantity of furnace deposits. Even with the benefit of this treatment the units had to be shut down every five to seven days because of excessive amounts of deposits which formed around the fuel and air nozzle. Also, the upper tubes would accumulate large deposits which would obstruct the flame pattern. Removal of these deposits required each generator to be out of service for several hours.

To obtain further deposit prevention a test of composition A fuel treatment was started on these units using one gallon of composition A per thousand gallons of fuel oil. The furnace surfaces were fairly clean since the change from gas to fuel oil was made immediately prior to this test.

In this series of tests composition A was almost 100% effective in preventing deposit formation in both Elesco steam generators.

After two weeks of continuous operation using composition A, the two Elesco steam generators were shut down for inspection. The top ports and fuel nozzles were clean. The tubes were free of deposit with the exception of two spots on the upper tubes. The deposits were about one foot in diameter. These were knocked off and left on the floors of the generators. After a second two week period of continuous operation the two steam generators were again opened for inspection. The results were about the same as observed after the first two weeks of operation. The deposits which had to be knocked off of the tubes were about half of the original size. After three more weeks of continuous operation the two steam generators were opened again for inspection. There was very little change, if any, from previous inspections. The only deposits formed were at the same two locations as observed after the first two week inspection and this appeared to be due to poor flame pattern. After seven weeks of continuous operation since the first inspection, the two steam generators were shut down again for inspection and the top ports and fuel nozzles were still in good operating condition. The tubes were free of excessive deposits. There was very little change, if any, from previous inspections.

Any of the copper salts of the branched chain acyclic aliphatic carboxylic acids of 5 to 12 carbon atoms in which the carboxyl group is attached to a carbon atom other than the central carbon atom in the longest hydrocarbon chain as disclosed in U.S. Patent 2,622,671, can be substituted for the copper salt of 2-ethylhexanoic acid in making compositions for the purpose of the present invention.

The fuel oils to which the concentrates may be added include heavy fuel oils such as are used in oil burning locomotives having a gravity from about 10° API to about 15° API, lighter fuel oils used in domestic burning fuels having gravities in the range from about 15° API to about 40° API and fuel oils used in jet engines such as kerosene.

The quantity of the soot remover concentrate which is added to the fuel oil may be varied depending to some extent upon the amount of dissolved copper in the concentrate. Since the quantity of dissolved copper in the concentrate is normally in excess of 0.4% and preferably at least 1% by weight, calculated as metallic copper, the quantity of copper in the final fuel oil after the concentrate has been added thereto is only a fraction of a percent. In terms of parts by weight of copper per million parts by weight of fuel oil, the quantity of copper is preferably within the range of 3 to 30 parts per million parts of fuel oil after the concentrate has been mixed with the fuel oil. The quantity of halo phenol, calculated as pentachlorophenol, is preferably within the range of 25 to 235 parts per million parts of fuel oil.

The concentrate composition can also contain a minor amount of auxiliary substances employed as retarders of polymerization of the oil as, for example, cresylic acid, nitrobenzene, the nitrophenols and/or alpha- or beta-naphthol. Likewise, sludge inhibitors can be incorporated with the concentrate or added to the oil as, for example, tricresylphosphate, hydroquinone, phenylene diamine and its derivatives, and the phosphorous-organic sulfur compounds derived by the reaction of paraffin or other aliphatic alcoholic substances and phosphorous pentasulfide.

If a surface active agent is added to the concentrate any of the surface active agents which are oil soluble can be used, including, for example, those described in Soap and Sanitary Chemicals of July, August, September and October 1952, entitled "Synthetic Detergents Up to Date," by John W. McCutcheon.

The invention is especially advantageous in providing an improved process and compositions for retarding or preventing fireside deposits in furnaces and other equipment which burn hydrocarbon distillate fuels which include cracked or uncracked components.

The liquid concentrates provided in accordance with the invention are essentially hydrophobic and readily dissolve in hydrocarbon fuels in the amounts in which they are effective in retarding and preventig the formation of soot when the fuels are burned. These concentrates are also prepared in such a manner that they are substantially stable.

The term "fuel oil" is intended to include combustible oils which are liquid or are capable of being liquefied when preheated. Thus, many of the residual oils are semi-solid in nature and are heated to temperatures of say 180° F. in order to increase their fluidity before they are used as burning fuels. It will be understood that the term "fuel oil" includes these semi-solid types of residual oils as well as the liquid types of fuel oils.

The invention is hereby claimed as follows:

1. A hydrophobic liquid concentrate comprising an oil soluble copper salt, a halo phenol and an ether of a polyol which is both water soluble and oil soluble and in which no ether group contains more than 6 carbon atoms, all homogeneously dispersed in a hydrocarbon distillate oil, the proportions of said copper salt and said halo phenol falling within the range of 1.33–37.5 parts by weight of halo phenol per part by weight of Cu and together being effective to lower soot formation when said concentrate is added to a fuel and burned, and the quantity of said ether being sufficient to prevent the formation of a precipitate due to the reaction of said copper salt and said phenol.

2. A hydrophobic liquid concentrate suitable for addition to fuel oils to retard soot formation comprising an oil soluble copper salt, a halo phenol and an ether of a polyol which is both water soluble and oil soluble and in which no ether group contains more than 6 carbon atoms, all homogeneously dispersed in a hydrocarbon distillate oil, the quantity of said hydrocarbon distillate oil being at least 30% by weight of the concentrate, the quantity of said copper salt, calculated as Cu, being within the range of 0.4% to about 1.5% by weight of the concentrate, the quantity of the halo phenol being within the range of 2% to 15% by weight of the concentrate, the quantity of the ether of the polyol being within the range of about 3% to about 15% by weight of the concentrate and the weight ratio of the ether of the polyol to the halo phenol being within the range of 5:1 to 1:5.

3. A composition as claimed in claim 2 containing up to 45% by weight of a sodium petroleum sulfonate.

4. A hydrophobic liquid concentrate suitable for addition to fuel oils to retard soot formation comprising a copper salt of a branched chain acyclic aliphatic carboxylic acid having 5 to 12 carbon atoms in which the carboxyl group is attached to a carbon atom other than the central carbon atom in the longest hydrocarbon chain, pentachlorophenol and an ether of a polyoxyethylene glycol which is both water soluble and oil soluble and in which no ether group contains more than 6 carbon atoms, all homogeneously dispersed in a hydrocarbon distillate oil, the quantity of said hydrocarbon distillate oil being at least 30% by weight of the concentrate, the quantity of said copper salt, calculated as Cu, being within the range of 0.4% to about 1.5% by weight of the concentrate, the quantity of the pentachlorophenol being within the range of 2% to 15% by weight of the concentrate, the quantity of the ether of the polyoxyethylene glycol being within the range of about 3% to about 15% by weight of the concentrate, and the weight ratio of the ether of the polyoxyethylene glycol to the pentachlorophenol being within the range of 5:1 to 1:5.

5. A hydrophobic liquid concentrate suitable for addition to fuel oils to retard soot formation comprising the copper salt of 2-ethylhexanoic acid, pentachlorophenol and an ether of a polyoxyethylene glycol which is both water soluble and oil soluble and in which no ether group contains more than 6 carbon atoms, all homogeneously dispersed in a hydrocarbon distillate oil, the quantity of said hydrocarbon distillate oil being about 70% to about 77.5% by weight of the concentrate, the quantity of said copper salt, calculated as Cu, being within the range of 0.4% to about 1.5% by weight of the concentrate, the quantity of the pentachlorophenol being within the range of 6% to 10% by weight of the concentrate, the quantity of the ether of the polyoxyethylene glycol being within the range of about 3% to about 5% by weight of the concentrate, the weight ratio of the ether of the polyoxyethylene glycol to the pentachlorophenol being within the range of 5:1 to 1:5.

6. A composition as claimed in claim 5 in which the ether of the polyoxyethylene glycol is the butyl ether of diethylene glycol.

7. A burning oil which burns with low soot formation comprising a fuel oil having intimately dispersed therein a fraction of a percent by weight, calculated as Cu, of an oil soluble copper salt, a fraction of a percent by weight of a halo phenol, and an ether of a polyol which is both water soluble and oil soluble and in which no ether group contains more than 6 carbon atoms, the quantity of said ether being sufficient to prevent formation of a precipitate by the reaction of said copper salt and said phenol.

8. A burning oil which burns with low soot formation comprising a fuel oil having intimately dispersed therein a fraction of a percent by weight, calculated as Cu, of an oil soluble copper salt of a branched chain acyclic aliphatic carboxylic acid having 5 to 12 carbon atoms in which the carboxyl group is attached to a carbon atom other than the central carbon atom in the longest hydrocarbon chain, a fraction of a percent by weight of a polychlorophenol, and an ether of a polyol which is both water soluble and oil soluble and in which no ether group contains more than 6 carbon atoms, the quantity of said ether being sufficient to prevent formation of a precipitate by the reaction of said copper salt and said phenol.

9. A burning oil which burns with low soot formation comprising a hydrocarbon distillate oil having intimately dispersed therein a fraction of a percent by weight, calculated as Cu, of a copper salt of 2-ethylhexanoic acid, a fraction of a percent by weight of pentachlorophenol, and an ether of a polyol which is both water soluble and oil soluble and in which no ether group contains more than 6 carbon atoms, the quantity of said ether being sufficient to prevent formation of a precipitate by the reaction of said copper salt and said phenol.

References Cited in the file of this patent

UNITED STATES PATENTS

| | | |
|---|---|---|
| 2,281,598 | Prutton | May 5, 1942 |
| 2,524,864 | Wies et al. | Oct. 10, 1950 |
| 2,622,671 | Johnson | Dec. 23, 1952 |